Patented Nov. 28, 1944

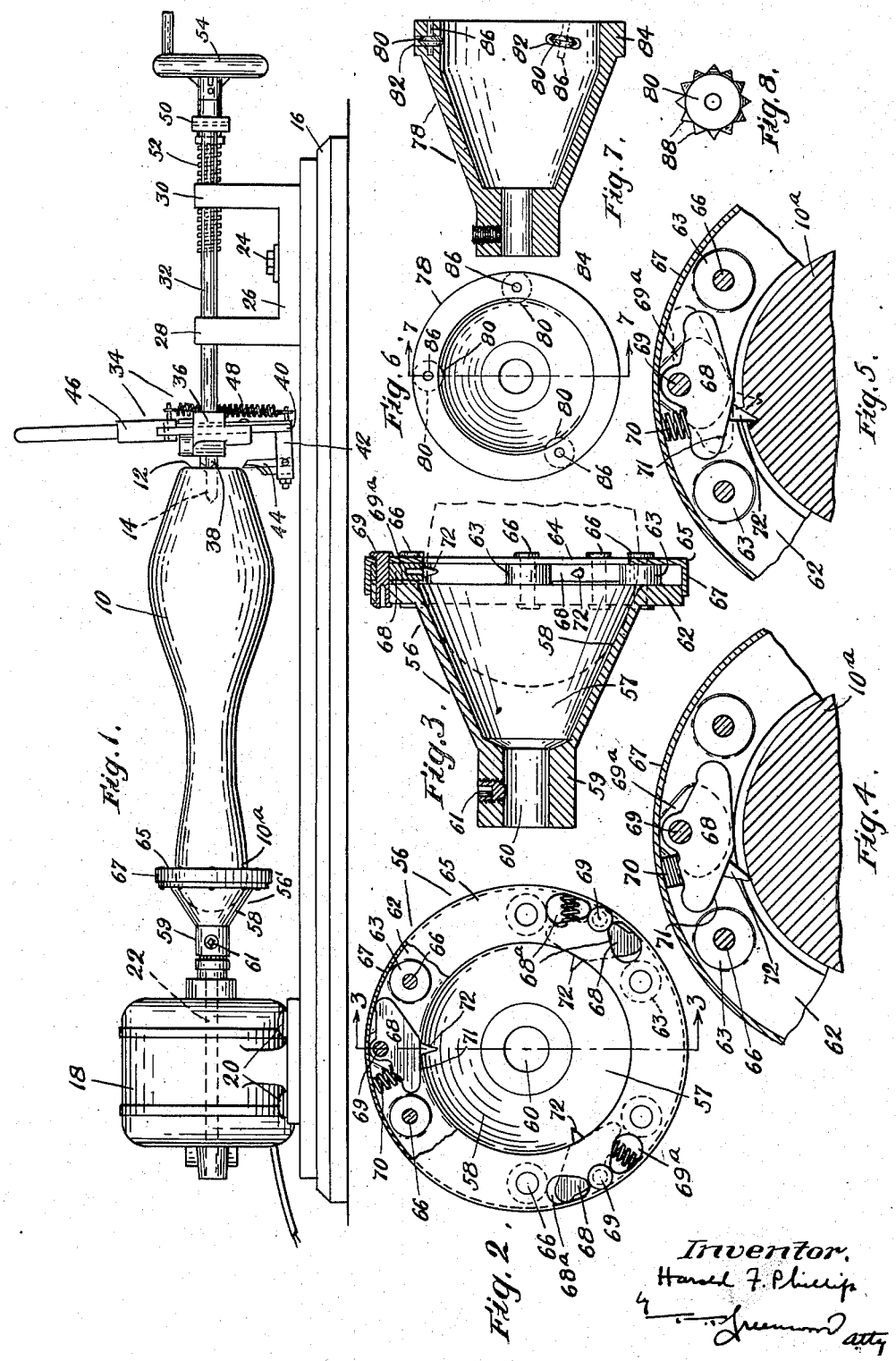
Nov. 28, 1944. H. F. PHILLIPS 2,363,899
ROTATABLE ARTICLE GRIPPING CHUCK
Filed Oct. 31, 1941

2,363,899

UNITED STATES PATENT OFFICE 2,363,899

ROTATABLE ARTICLE GRIPPING CHUCK

Harold F. Phillips, Belmont, Mass.

Application October 31, 1941, Serial No. 417,318

2 Claims. (Cl. 279—33)

The present invention relates to the reconditioning of bowling pins and particularly to a chuck for holding the pins during the reconditioning thereof.

Bowling pins, such for example, as duck pins, bottle pins, candle pins or the like are provided with a bottom supporting or bearing surface extending at right angles to the longitudinal axis of the pin. These supporting surfaces soon become broken, dented, or otherwise damaged during use and, as a result, become rounded or reduced in area to such an extent that the pins will not stand up properly in the bowling alley. The damaged pins are repaired by having the irregular bearing or supporting ends thereof cut off or refaced.

The refacing of damaged supporting surfaces of bowling pins has been, in the past, generally unsatisfactory because of the lack of proper equipment. In my co-pending application for United States Letters Patent, Serial No. 316,384, filed January 30, 1940, now Patent No. 2,309,532, issued January 26, 1943, of which this application is a continuation in part, I have provided a machine for reconditioning bowling pins which has gone into extensive use and which is so simple in operation that the bowling pins can be satisfactorily reconditioned even by an unskilled and inexperienced operator. This machine is provided with a chuck mounted on a motor shaft forming the head stock of the machine. The chuck, as illustrated therein, is provided with means projecting into the hollow head portion of the chuck which permits relative rotational movement between the chuck and the bowling pin in a backing-off direction but upon a predetermined amount of relative rotational movement in a gripping direction the bowling pin becomes firmly locked into position both against rotational and longitudinal movement. The operator thus is enabled to insert the head of the bowling pin into the chuck and to secure the pin into position therein with a minimum of manipulation. The machine is provided with a tail stock having thereon a boring tool which acts also as a center for the pin. Thus, after the pin has been locked into the chuck, as above described, and the boring tool has been inserted into the longitudinal recess or bore in the base of the bowling pin to support the pin with its longitudinal axis in alignment with the axis of rotation of the head stock, the refacing operation of the base can readily and easily be performed even by an unskilled operator since the refacing or cutting off tool is mounted for movement axially of the pin with the boring tool and is also mounted for radial movement relatively to the boring tool to perform the cutting off or refacing operation.

The chuck referred to above effectively prevents relative rotational movement between the pin and the chuck in one direction and also prevents longitudinal axial movement of the pin but under some conditions, particularly when bowling pins having heads of relatively small diameter are to be held in the chuck, it is sometimes found difficult to lock the bowling pin in position in the chuck as tightly as is desired.

An object of the present invention is to provide an improved form of bowling pin chuck which can maintain a firm non-slipping grip on the rounded ends of all types of bowling pins even though the gripped portions of the heads of such pins may vary substantially in diameter.

Another object of the invention is to provide an improved bowling pin chuck in which the head of the pin will be firmly gripped and which permits ready release of the pin and yet will not deface it objectionably.

In one preferred form of my bowling pin chuck, wherein the pin gripping means is pivotally mounted for movement into and out of gripping engagement with the pin, it is necessary that waste material be prevented from interfering with the pivotal movement of the gripping means in order that the gripping means may be free to move into and out of gripping engagement with the pin. A still further object of the invention, therefore, is to provide a chuck wherein pivotal movement of the gripping means into and out of gripping engagement with the bowling pin is insured.

A still further object of the invention is to improve generally upon the construction and operation of the machines for truing articles, such for example, as bowling pins.

With the above and other objects and features in view, the invention will now be described with reference to the accompanying drawing in which:

Fig. 1 is a view in front elevation illustrating a machine in which the present invention is embodied;

Fig. 2 is a view in end elevation of the chuck member;

Fig. 3 is a view in cross-section taken along the line 3—3 of Fig. 2;

Fig. 4 is an enlarged fragmentary view, partly in section, illustrating a bowling pin about to be gripped by one of the chuck elements;

Fig. 5 is a view similar to Fig. 4 and illustrating the pin gripping means in position to grip the pin to prevent both relative rotational and axial movement of the pin and the chuck;

Fig. 6 is a view in end elevation of the chuck disclosed and claimed in my above-identified prior application;

Fig. 7 is a view in section taken along the line 7—7 of Fig. 6; and

Fig. 8 is a view on an enlarged scale illustrating a further modified form of a bowling pin engaging disc.

The machine of the present invention is designed to recondition bowling pins such as the bottle pin 10 illustrated in Fig. 1 of the drawing. A somewhat shorter type, known as a duck pin, and a somewhat longer type, known as a candle pin, may also be reconditioned by the use of the present machine. These types, however are not illustrated herein as they are well-known types. Regardless of the type of pin, each type of pin is provided with a supporting base 12 and a longitudinal or axial cylindrical bore or hole 14. The base 12 is flat or preferably slightly dished or concave so that the outer edge part only of the base 12 engages the floor to form a stable support for the pin. During use, the bottom part of the pin becomes damaged, as splintered, indented, crushed and the like, and the machine is used to recondition the surfaces by cutting off the damaged material and providing a new surface.

The pin conditioning machine of the present invention, as illustrated herein, includes a flat horizontal base 16 formed of metal or other suitable rigid material. The left hand end part of the base 16 is provided with an electric motor 18 which is fixed to the base by suitable bolts or other fastenings 20. The electric motor 18 is provided with a shaft 22 extending along the longitudinal axis of the base 16, the motor and its accessories forming the head stock of the machine. The other end part of the base 16 has secured thereto by a suitable bolt 24 and aligning pin (not shown) a tail stock comprising a bracket 26 provided with a pair of vertically extending horizontally spaced arms 28 and 30, the upper end parts of the front and rear portions of the arms 28 and 30 being provided with aligned openings for slidably receiving a pair of horizontally-disposed parallel slides or bars 32 one of which is illustrated in Fig. 1. The inner ends of the slides or bars 32 are fixed to a bowling pin base supporting mechanism 34.

The base supporting mechanism 34 comprises, as shown in Fig. 1, a vertically disposed casting 36 fixed to the left hand ends of the bars 32. The casting 36 between the bars 32 is provided with means for receiving a boring tool 38 which is fixed in position on the casting 36 and has its center disposed in alignment with the axis of rotation of the shaft 22 of the motor 18. The casting 36 is also provided with a substantially vertically extending recess receiving a slide 40 which at its lower end carries a laterally extending bracket 42 to which is rigidly secured the base cutting or refinishing tools 44. The slide 40 is arranged to be moved upwardly and to move its refinishing tools into engagement with and across the bottom surface of the pin 10 to remove the damaged material therefrom and to true the face thereof.

The slide 40 is connected through suitable connections to a handle 46 which when moved by the operator moves the re-finishing tools 44 upwardly and into engagement with the pin 10. A spring 48 is provided, which is connected at one end to the slide 40 and at its other end to the casting 36. Thus, when the handle 46 is released, the spring 48 operates to move the slide 40 and the refinishing tools 44 carried thereby into the retracted or out-of-use position shown in Fig. 1.

The right hand end of the rods or bars 32 are connected together by a transversely extending substantially horizontal bar 50 which is provided intermediate its ends and between the bars 32 with an opening to receive the reduced end portion of a screw 52. The right hand end portion of the screw 52 is provided with a hand wheel for manually rotating the screw. The screw 52 extends toward the left and is threaded in an opening formed in the right hand vertical supporting member 30. Thus, when the handle 54 is rotated the bowling tool 38 and the refinishing mechanism carried by the left hand ends of the rods 32 is moved toward and into the opening 14 formed in the base of the bowling pin 10.

Thus, when the boring tool 38 has been inserted into the base of the pin the desired distance, the refinishing tools 44 are moved upwardly into cutting engagement with the work by manipulation of the handle 46. Thus, the base supporting mechanism 34 is effective not only to support the bowling pin for rotational movement but also, upon manipulation by the operator, to reface or true the end of a damaged bowling pin 10.

It is to be noted at this point that the different types of bowling pins are not all of the same length. It is desirable, therefore, in order to prevent the use of a long feed screw 52 and a long tail stock bracket, to so arrange the tail stock bracket that it may be moved toward and away from the cutter and may be clamped to the base in any one of a number of predetermined positions. The mechanism above described is not claimed herein since it is described and claimed in my above mentioned co-pending application.

With the end-conditioning mechanism herein described, it is necessary that the bowling pin not only be rotated but in addition be held against axial displacement both toward and away from the said mechanism and this invention provides a chuck that accomplishes these results and also one that grips and releases the work quickly and without objectionable marring of the work.

The chuck engages the head end part 10a of the bowling pin and includes a conical or cup-shaped member 56 open at the end facing the tail stock and having an internal recess or bore 57 that has a tapered or conical side wall 58 converging toward the motor and toward a hub 59 that has a shaft passage 60 co-axial with the tapered side wall, the hub having a set screw 61 which fixes the chuck to the motor shaft both against rotation and axial movement independently thereof. It is understood that the motor shaft is held against undue axial movement by the motor frame and its bearings. The opening of the recess 57 is at least as large as the maximum diameter of the head 10a of the bowling pin so that the head can enter the recess and engage the tapered side wall 58 and be centered thereby. The open end of the recess 57 is surrounded by a radially outstanding flange 62 integral with the chuck body. Said flange is provided with a plurality of axially projecting bosses 63 against which the radial wall 64 of a cover 65 is seated, the cover being secured in the aforesaid relation by rivets 66 passed therethrough and through said bosses. Said wall 64 is provided with an axial opening commensurate in diameter and aligned with the opening in the chuck body. The cover is provided with a cylindrical wall 67 that overlies and covers the radial space between said bosses and closely surrounds a part of said outstanding flange 62.

The cover 65 and flange 62 cooperate to provide a housing or inwardly opening channel for a plurality of chuck dogs, herein three, equiangularly disposed in said housing between said bosses and consisting of plates or levers 68 substantially co-extensive in thickness with the axial space between said flange 62 and cover 65 at the plates and pivoted at their upper middle parts on rivets 69 carried by said flange and housing. Bearing pads 68a of the flange 62 form broad supports for the levers so that they can turn without becoming displaced axially. Compression springs 70 bearing against the cylindrical wall 67 of said cover and against end parts of said plates, Fig. 2, urge said plates constantly for rotation in a counterclockwise direction and hence, when the chuck is not in use, hold the opposite ends of said plates against said wall. In this position the under face 71 of each plate is more or less tangential to the axis of the chuck. Each of said plates has fixed thereon a driving pin or spur 72 that projects approximately at right angles to its associated face 71, the pins being pointed to penetrate the head of the bowling pin and form effective driving connections between the bowling pin and the body of the chuck.

When the head of a bowling pin is inserted in the chuck by movement axially, the driving pins 72 are pushed or cammed in a clockwise direction from the position illustrated in Fig. 2 to that illustrated in Fig. 4. This can be done without rotating the bowling pin if the head is rounded as illustrated, or by rotating the bowling pin counterclockwise relative to the chuck. The bowling pin is inserted in the chuck preferably until the head abuts against the tapered wall 58 of the recess 57 and the head becomes centered in the chuck. The driving spurs or pins 72 are then in contact with the surface of the bowling pin and are inclined in the direction of rotation of the chuck. When the chuck is rotated, or when the bowling pin is rotated clockwise and the chuck is held stationary the driving pins catch and imbed into the bowling pin as illustrated in Fig. 5, the driving pins approaching more nearly into the radial line through the center of the bowling pin and the pivot 69 of the chuck plate.

With this arrangement, the drive between the chuck and the bowling pin is positive and nonslipping, as any tendency toward slipping causes the driving pins to imbed still further in the bowling pin. The driving pins are long enough and the angle of swing thereof from a bowling pin disengaging position to a driving position is enough for the accommodation of bowling pins having as great a range of head diameters as will be encountered in the usual alley.

Release of the bowling pin from the chuck is secured by rotating the pin counterclockwise relatively to the chuck body whereupon the pins roll out of their indentations in and disengage the bowling pin. No particular amount of force is necessary to be applied to the bowling pin to disengage it from the chuck as the driving pins in effect pivot on the bowling pin and about their pivots 69 and thus roll out of engagement with little friction.

Since the driving plates 68 are held in the chuck against axial displacement, the driving pins 72 also hold the bowling pins against axial displacement.

In the modification shown in Figs. 1 to 5, inclusive, it is necessary that pivotal movement of the members 68 into and out of gripping engagement with the bowling pin 10 be maintained at all times. It is apparent that the centrifugal action of the chuck 62 will cause wood dust and other waste material to be thrown against the inner wall 67 of the chuck and as a result this space will be filled with waste material to such an extent that movement of the member 68 may be prevented. In order to avoid this difficulty, and to insure that the member 68 is free for pivotal movement at all times, a series of openings 69a is provided to permit access to the space between each of the members 68 and the peripheral wall 67. As shown most clearly in Fig. 2, the openings 69a are formed in the cover plate 65 on either side of the pivot pin 69 for the member 68. These openings are sufficiently large to permit the operator to insert therein a thin rod to loosen the lodged waste material and to permit its removal. The openings 69a also prevent rapid accumulation of waste material about the members 68 since most of the material is thrown out of the openings and thus it is not necessary to stop the chuck to remove the waste material except at relatively long intervals. The openings 69a also provide convenient inspection openings which enable the operator with a minimum effort to determine whether or not sufficient waste material has accumulated behind the members 68 to prevent free pivotal movement of the members.

The modification illustrated in Figs. 6 and 7 of the drawing is the same as that described and claimed in my co-pending application Serial No. 316,384, filed January 30, 1940, which has been referred to above. As shown best in Fig. 6, the chuck 78 is hollow and is internally tapered as previously described to receive the head end of the bowling pin 10. The diameter of the opening of the chuck 78 is substantially equal to the maximum diameter of a head portion of the pin 10. Thus, the head of the bowling pin 10 can engage the inside tapered wall of the chuck 78 and be centered thereby with respect to the axis of rotation of the shaft of the motor 18. The chuck 78 is provided with a plurality of wheels or discs 80 which are located in openings 82 formed in the marginal edge portion 84 of the chuck 78 adjacent to the open end thereof. The wheels 80 are located at the same acute angle to the axis of rotation of the chuck 78 and are rotatably mounted on pins 86 which are driven through and held in holes bored from the open end of the chuck. The discs 80 are provided with relatively sharp peripheral pin-engaging edge portions and operate as screw sections to imbed into the outer surface of and to force the end of the head of the bowling pin 10 against the inside of the cup and thus hold the pin locked in the chuck. As a matter of practice, however, the diameter of a circle that is tangent to the inner edges of the disc is slightly less than the maximum diameter of the head end of the bowling pin 10 and hence the discs 80 can dig into the head and grip the pin securely without screwing the bowling pin against the inner face of the cup. The discs 80, however, being rotatable permit removal of the bowling pin 10 from the chuck 78 readily when the chuck 78 is held stationary and the bowling pin 10 is rotated in the direction of rotation of the motor 18 since the discs merely travel in the grooves previously made.

The discs 80, instead of having a continuous periphery, may have a series of teeth or spurs 88 as is illustrated with the modified form of disc 90 of Fig. 8, each tooth in contact with a bowling pin indenting into the surface thereof to drive the pin and rolling freely out of the indentations in releasing the pin.

It is evident from the above that the chuck 78 and the boring tool-supporting mechanism 34 are so arranged that the bowling pin 10 may readily be inserted in the chuck 78 and the boring tool 38 inserted in a central opening 14 formed in the base end 12 of the bowling pin 10 to insure that the bowling pin 10 will be rotated about its geometric longitudinal axis. The chuck 78 also holds the bowling pin 10 against axial displacement.

Having thus described my invention, what I claim as new and desire to secure by Letters Patent of the United States is:

1. A chuck comprising a hollow work receiving member and means movably mounted interiorly of said member positioned in the path of an entering work piece and movable thereby in direction permitting reception of the work piece in said member, said means comprising a conical driving spur of substantial length swingable in a plane transversely of the longitudinal axis of said member, the conical surface of said spur facing the entrance to the chuck in position to be engaged by the entering work piece and to be cammed thereby outwardly from the axis to permit the work piece to enter said member, said spur being arranged and adapted to pierce the work piece upon relative rotation of the said member and work piece in one direction, thereby to lock the said member and work piece against further relative rotation in the same direction and against movement of the work piece axially of the chuck.

2. A chuck comprising a hollow work receiving member and means movably mounted interiorly of said member positioned in the path of an entering work piece and movable thereby in direction permitting reception of the work piece in said member, said means comprising a plurality of circumferentially disposed work gripping elements pivotally mounted interiorly of said member for swinging movement generally cross-wise of the longitudinal axis of the chuck, each said element having a conical driving spur of substantial length having a conical surface facing the entrance to the chuck in position to be engaged by the entering work piece and to be cammed thereby outwardly from the axis to permit the work piece to enter said member, the spurs of said gripping elements being arranged and adapted to pierce the work piece upon relative rotation of the said member and work piece in one direction, thereby to lock the said member and work piece against further relative rotation in the same direction and against movement of the work piece axially of the chuck.

HAROLD F. PHILLIPS.